Patented Dec. 1, 1953

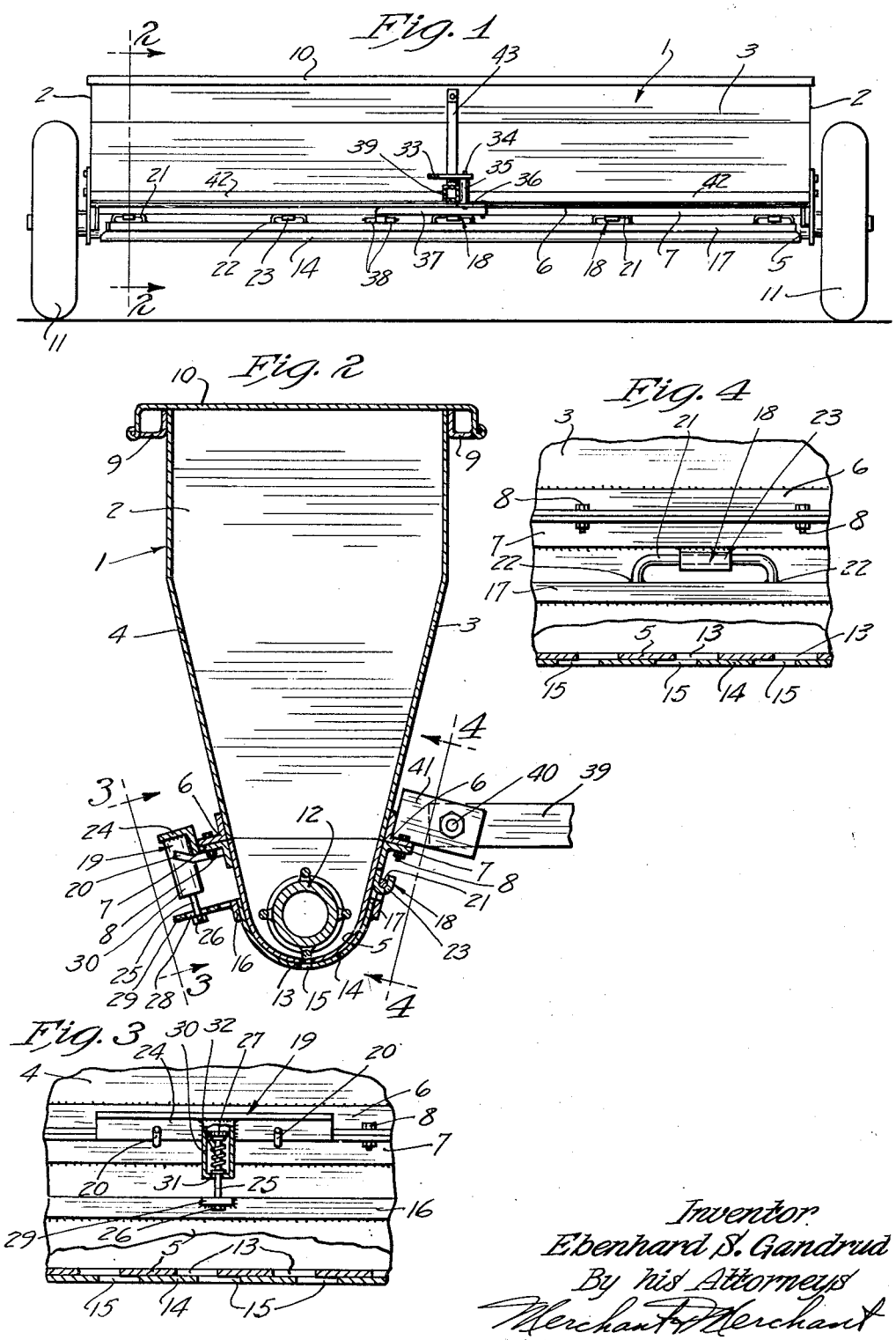

2,661,125

UNITED STATES PATENT OFFICE 2,661,125

DETACHABLE MOUNTING FOR RATE CONTROL SLIDE IN FERTILIZER SPREADERS

Ebenhard S. Gandrud, Owatonna, Minn.

Application November 4, 1950, Serial No. 194,161

2 Claims. (Cl. 222—177)

My present invention relates generally to machines for broadcasting and evenly distributing dry granular fertilizer, seeds and the like, and more specifically is in the nature of an improvement on the structure disclosed in my prior United States Letters Patent No. 2,350,107.

An important object of my invention is the provision of a hopper having discharge apertures in its bottom portion and a movable valve-acting gate plate associated therewith which may be easily adjusted to meter the flow of material from the hopper.

Another object of my invention is the provision of means whereby said gate plate may be quickly removed from the machine for cleaning, replacement, or the like, and reattached thereto.

Still another object of my invention is the provision of mounting means for said gate plate which will permit valving movements to be imparted thereto and which will tend to frictionally hold said gate plate in any desired set position.

A still further object of my invention is the provision of a valve-acting gate and mounting means therefor as set forth which is relatively simple and inexpensive to produce, which is efficient in operation, and which is rugged in construction and durable in use.

Other highly important objects and advantages of my invention will become apparent from the following detailed specification, appended claims, and attached drawings.

Referring to the drawings, which illustrate the invention, and in which like characters indicate like parts through the several views:

Fig. 1 is a view in front elevation of a spreader for granular fertilizer, seeds, and the like, incorporating my invention;

Fig. 2 is a transverse section taken on the line 2—2 of Fig. 1 and on an enlarged scale, some parts being broken away;

Fig. 3 is a fragmentary detail in elevation as seen from the line 3—3 of Fig. 2, some parts being broken away and some parts shown in section; and Fig. 4 is a fragmentary detail in elevation as seen from the line 4—4 of Fig. 2, some parts being broken away and some parts shown in section.

My improved spreader involves an elongated hopper or receptacle 1 having end walls 2, front and rear walls 3 and 4, respectively, and a cross-sectionally U-shaped bottom hopper section 5. The front and rear walls 3 and 4, at their lower edges, are provided with flanges 6 which are preferably made from angle iron or the like and which engage flanges 7 of the hopper bottom 5. The flanges 7 are rigidly secured to the flanges 6 by nut-equipped bolts or the like 8. At its top, the hopper 1 is reinforced by angle irons 9 and is provided with a removable cover 10.

The hopper 1 at its opposite ends is supported by a pair of pneumatic tire-equipped wheels 11 which have driving connections to rotary agitator means 12, all as disclosed in my prior patent above identified. The hopper bottom portion 5 is provided with a plurality of longitudinally spaced apertures 13 for the discharge of granular fertilizer, seeds, or the like, from the interior of the hopper 1.

An elongated cross-sectionally U-shaped valve-acting gate 14 fits against the concave bottom 5 of the hopper and is provided with a plurality of discharge passages 15 that correspond in form and spacing to the discharge passages 13 in the bottom 5, and are adapted to be moved more or less into registration with the discharge passages 13 of the bottom 5 or to be moved entirely out of registration therewith. The opposite side edges of the gate plate 14 are reinforced by stiffening bars 16 and 17 which extend along the entire length of the plate 14. Said gate plate is mounted on the hopper 1 for longitudinal sliding movements with respect thereto and hinged thereto for lateral swinging movements about an axis extending longitudinally of the hopper by hinge means 18 and cooperating latch elements 19 and 20. The hinge means 18 comprise a plurality of generally U-shaped pintle pins 21 having their opposite ends welded or otherwise rigidly secured to the stiffening bar 17, as indicated at 22, and cooperating upwardly opening hooks 23 welded or otherwise secured to the adjacent side portion of the hopper wall 3. The latch elements 20 are in the nature of a longitudinally spaced pair of laterally outwardly projecting hooks welded to the strengthening flanges 7. The latch element 19 comprises a latch bar 24 extending longitudinally of the hopper and which is adapted to be moved into or out of latching engagement with the hooks 20, see Figs. 2 and 3. The latch bar 24 is connected to the adjacent side edge of the gate plate 14 by an extensible and retractable member in the nature of a plunger rod 25 having a head 26 at its lower end and a head or flange 27 at its upper end. The lower end portion of the plunger rod 25 extends through a slot 28 in a laterally outwardly projecting ear 29, the inner end of which is welded or otherwise secured to the stiffening bar 16. The upper flange-equipped end portion of the plunger rod 25 is contained within a tubular shell 30 the upper end portion of which is rigidly secured to the central portion of the latch bar 24 and the lower end 31 of which is provided with a central aperture through which the plunger rod 25 slidably moves. A coil compression spring 32 is interposed between the flange 27 of the plunger rod 25 and the lower end 31 of the shell 30 whereby to bias the plunger rod 25 toward its retracted position in the shell 30. Although but one co-operating set of latch elements 19 and 20 are shown, it should be obvious that the machine may be provided with a plurality thereof longitudinally spaced with respect to the hopper 1.

Means for adjustably moving the valve-acting gate plate 14 longitudinally of the hopper 1 to move the apertures 13 and 15 into and out of partial or full registration with each other comprises a lever 33 secured at one end to a shaft 34 journalled in a bearing 35 on the front wall 3 of the hopper. At its lower end, the shaft 34 is mounted fast on one end of a crank arm 36 which is pivoted at its other end to one end of a pitman rod 37, the other end of which is contained between a pair of longitudinally spaced lugs 38 on the stiffening bar 17 of the gate plate 14. The above-described mechanism is but one of a number of arrangements whereby the gate plate may be longitudinally moved with respect to the hopper, another being illustrated in my prior Patent No. 2,350,107. The length of the pintle pins 21 with respect to the width of their cooperating hooks 23, and the spacing of the latch hooks 20 with respect to the width of the shell 30 contained therebetween, amply provides for sufficient longitudinal movement of the gate plate 14 to cause the apertures 13 to be entirely closed by the gate plate 14, or to move the apertures 15 into full registration with the apertures 13. It should be noted that the above arrangement provides for a relatively stable condition of the gate plate 14 with respect to the hopper in all positions of adjustment thereof, and that there is no bias exerted thereon in either direction longitudinally of the hopper.

It is sometimes desirable to separate the gate plate 14 from the hopper bottom 5 for the purpose of cleaning the engaging surfaces thereof of granular material which may have worked itself therebetween. When this occurs, it is but necessary to raise the latch bar 24 against bias of the spring 32 out of engagement with the hooks 20, and swing the latch element 19 laterally outwardly of the outer ends of the hooks 20. The gate plate 14 will then swing downwardly and forwardly under the action of gravity about the axes of the pintle pins 21, thereby exposing the inner surfaces of the gate plate 14 and the outer surface of the hopper bottom 5. If it is desired to completely remove the gate plate 14 from the machine, it is then merely necessary to disengage the pintle pins 21 from their cooperating hooks 23. This arrangement enables the gate plate 14 to be replaced if damaged or for any other reason. The spring or springs 32 place the gate plate 14 under tension to frictionally engage the bottom 5 of the hopper so that a close fit therebetween is assured at all times.

Means for moving my improved spreader comprises a draw bar 39 pivotally secured as indicated at 40 to a bracket 41 rigidly secured to the hopper by any suitable means. A pair of brace members 42 and a central brace member 43 are each connected at one of their ends to the hopper 1 and at their opposite ends to the draw bar 39 in the same manner as shown in my prior patent above identified.

My invention has been thoroughly tested and found to be completely satisfactory for the accomplishment of the objectives set forth; and, while I have shown and described a commercial embodiment of my improved spreader, it will be understood that the same is capable of modification without departure from the spirit and scope of the invention as defined in the claims.

What I claim is:

1. In a device of the class described, a hopper having longitudinally spaced delivery apertures in its bottom portion, means for supporting the hopper in spaced relation to the ground, a longitudinally movable valve-acting gate plate normally engaging the bottom of the hopper and having longitudinally spaced apertures registrable with the apertures in said hopper, and means mounting said gate plate on said hopper for longitudinal sliding movements with respect thereto and for lateral swinging movements toward and away from engagement with the bottom of the hopper about an axis extending longitudinally thereof, said means comprising a plurality of aligned hinge pintles on one side edge portion of said gate plate and a plurality of upwardly opening hooks on the adjacent side of said hopper, one each engaging one of said pintle pins and longitudinally slidable thereon, and cooperating latch elements on the opposite side edge of said gate plate and the adjacent side portion of said hopper and comprising a pair of longitudinally spaced laterally outwardly projecting latch hooks on said hopper, a latch bar engageable with said latch hooks, an extensible and retractable member connecting said latch bar with said gate plate, and yielding means tending to retract said member, the latch element on said gate plate being slidable with respect to the latch element on said hopper in a direction longitudinally of said hopper when the latch elements are in latching engagement.

2. In a device of the class described, a hopper comprising opposed side walls, end walls, and a cross-sectionally U-shaped bottom portion, means for supporting the hopper in spaced relation to the ground, said bottom portion having a plurality of delivery apertures in spaced relationship longitudinally of the hopper, a longitudinally movable valve-acting gate plate normally engaging the bottom of the hopper and having longitudinally spaced apertures registrable with the apertures in said hopper bottom portion, and means mounting said gate plate on the hopper bottom portion for longitudinal sliding movements and for swinging movements with respect to said hopper bottom portion about an axis extending longitudinally of said hopper, said means comprising cooperating hinge elements on one side of the hopper bottom portion and the adjacent side edge portion of the gate plate and secured together for relative sliding movements longitudinally of the hopper, and cooperating latch elements on the opposite side edge of said gate plate and the adjacent side of the hopper bottom portion, the latch element on said gate plate being slidable with respect to the latch element on the hopper bottom portion in a direction longitudinally of the hopper when said latch elements are in latching engagement.

EBENHARD S. GANDRUD.

References Cited in the file of this patent

UNITED STATES PATENTS

| Number | Name | Date |
|---|---|---|
| 1,722,713 | Smith | July 30, 1929 |
| 2,193,253 | Masters | Mar. 12, 1940 |
| 2,350,107 | Gandrud | May 30, 1944 |
| 2,550,303 | Simpson | Apr. 24, 1951 |